United States Patent [19]

Shimizu

[11] Patent Number: 4,533,212

[45] Date of Patent: Aug. 6, 1985

[54] ACCESSORY HOLDING DEVICE FOR OPTICAL INSTRUMENT

[75] Inventor: Seiichi Shimizu, Kanagawa, Japan

[73] Assignee: Canon Kabushiki Kaisha, Tokyo, Japan

[21] Appl. No.: 623,538

[22] Filed: Jun. 22, 1984

Related U.S. Application Data

[63] Continuation of Ser. No. 342,206, Jan. 25, 1982, abandoned.

[30] Foreign Application Priority Data

Feb. 9, 1981 [JP] Japan ............................. 56-16984[U]

[51] Int. Cl.³ .......................... G02B 7/00; G02B 5/22
[52] U.S. Cl. .................................... 350/318; 350/257; 350/276 R
[58] Field of Search ............ 350/318, 257, 252, 276 R; 354/295

[56] References Cited

U.S. PATENT DOCUMENTS

| 1,228,389 | 6/1917 | Barnes | 350/318 |
|---|---|---|---|
| 1,780,384 | 11/1930 | Green | 350/318 |
| 4,050,791 | 9/1977 | Watanabe | 350/257 |
| 4,302,078 | 11/1981 | Stravitz | 350/318 |
| 4,381,885 | 5/1983 | Coquin | 350/318 |
| 4,390,242 | 6/1983 | Tatsumi | 350/318 |

FOREIGN PATENT DOCUMENTS

| 70922 | 6/1942 | Czechoslovakia | 350/318 |
|---|---|---|---|
| 250083 | 8/1947 | Switzerland | 350/318 |

*Primary Examiner*—Jon W. Henry
*Attorney, Agent, or Firm*—Toren, McGeady, Stanger, Goldberg & Kiel

[57] ABSTRACT

Device for holding attachments such as filters attachable to the mounting portion of an optical instrument such as an interchangeable lens. The device facilitates the mounting and removal of the attachments.

4 Claims, 10 Drawing Figures

ACCESSORY HOLDING DEVICE FOR OPTICAL INSTRUMENT

This is a continuation of application Ser. No. 342,206, filed Jan. 25, 1982, and now abandoned.

BACKGROUND OF THE INVENTION

1. Field of the Invention:

This invention relates to a holding device for attachment of a filter, particularly one which is relatively thin, to an optical instrument such as interchangeable lens or intermediate tube.

2. Description of the Prior Art:

In single lens reflex cameras, interchanging the objective lens enables strong and weak perspectives and changing of the image angle to be effected so that even when photographing the same scene, different pictures can be obtained. Therefore, the use of a great number of interchangeable lenses of different focal lengths enables the photographer to make a desired selection. Among the interchangeable lenses, the super wide angle lens of emphatic perspective encounters many opportunities to be used, and a great many excellent lenses have been developed and are available in the market.

However, when considering using a filter with the super wide angle lens, the attachment thereof to the front end of the lens mounting in the case of normal and telephoto lenses gives rise to problems in that the filter becomes large and expensive. Also, because the curvature of the exposed surface of the front lens member is very sharp as the angular field of view is widest, there is a high possibility of mechanical interference between the filter and the front lens member. It has, therefore, been common practice in the art that a few filters are provided in the interior of the lens system in changeable positions, or that a special filter is fixed to the rear wall of the lens mounting. In any case, there is a drawback in that the number of different filters usable is limited.

In the case where the above-mentioned drawback is eliminated by using gelatin filters, which are available in a great number of types and are very cheap, because of the lack of an anti-reflection coating on the filter, ghost and flare are produced, thus creating an alternate drawback preventing good photographs from being taken.

SUMMARY OF THE INVENTION

It is an object of the present invention to provide a holding device for inserting and seating, and/or releasably arranging an accessory such as a filter into and in an optical instrument such as an interchangeable lens mounting or an intermediate tube at an opening portion of an adapter portion to be attached to (for example, a photographic instrument such as a camera, or an enlarger) in a plane almost perpendicular to an optical axis of a light path through the opening portion.

Another object of the present invention is to provide a holding device for the aforesaid filter or like accessory arranged at an angle of inclination with the optical axis of the light path, whereby it is made possible to provide an interchangeable lens or an intermediate tube which is able to reduce ghost and flare in the image with ease.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
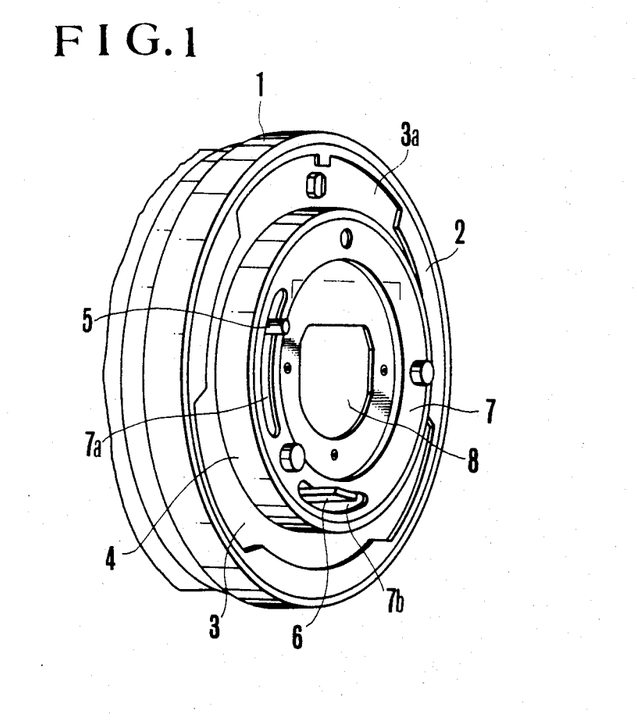
FIG. 1 is a perspective view of the main parts of an interchangeable lens mounting or an intermediate tube known in the art which has an accessory holding device of the invention.
Figure 2A:
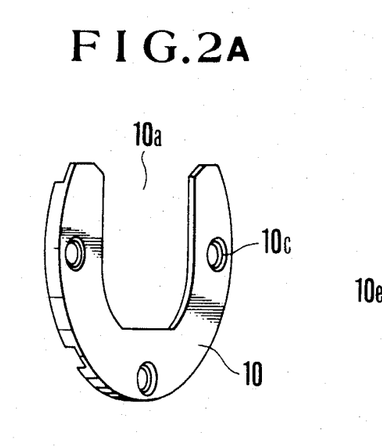
FIG. 2A is a perspective view looking from the outside of a constituent member of the holding device of the invention.
Figure 2B:
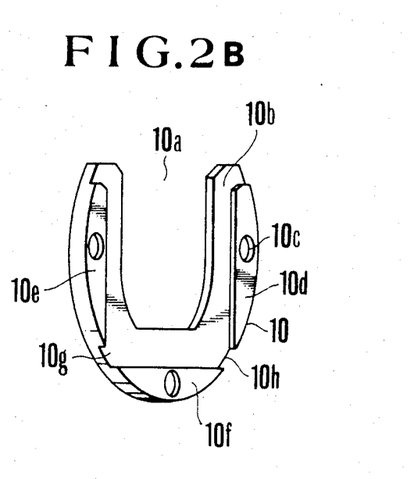
FIG. 2B is a perspective view looking from the inside of the member of FIG. 2A.

FIG. 1 illustrates the rear end of a conventional interchangeable lens mounting or an intermediate tube having an adapter sleeve to be fitted in an opening of a camera body. 1 is an outer barrel of the lens mounting or the intermediate tube; 2 is a coupling ring such as a bayonet mount mounted on the barrel 1; 3 is a mount member having an optical reference surface 3a to assist in adjusting the position of the barrel body 1 relative to the camera body.

The mount member 3 and the barrel body 1 are arranged to be rotatable relative to each other. With the mount member 3 being held non-rotative relative to the camera body, the barrel body 1 is turned to perform a tightening operation, whereby the bayonet coupling 2 is engaged with a camera-side bayonet coupling. Instead of such attaching device known in the art, it is also possible to use an alternative wherein the mount member 3 and the barrel body 1 are arranged in fixedly secured relation, and attachment is performed by turning the lens as a whole.

4 is a sleeve portion extending from the mount member 3 along an optical axis toward the camera body, and having a signal member 5 and a drive member 6 which are arranged to be movable along the inner periphery of said sleeve portion 4. 7 is a cover member on the rear end of the sleeve 4 which member is provided with an opening 8 for a light path. 7a and 7b are arcuate slots for rotative movement of the aforesaid signal and drive members respectively.

It is noted that the aforesaid signal member 5 and drive member 6 are supported to be rotatable by mount means comprising the mount member 3 and sleeve portion 4, the signal member 5 transmitting exposure signals between the optical instrument side and the basic body side, and the drive member 6 being arranged to actuate a diaphragm device within the optical instrument on the basis of a drive signal.

FIGS. 2A and 2B and FIGS. 3A and 3B illustrate the front and back faces of holding members 10 and 14 constituting the device of the invention. The holding member 10 is configured to an almost letter "U" shape or a semi-circular shape with the provision of an opening portion 10a through which a filter member 11 is inserted and taken out. The holding member 10 is fixedly secured to the cover member 7 of the adapter portion of the lens mounting by screw fasteners 12a, 12b and 12c as illustrated in FIG. 4. In the back surface of the holding member 10 is formed a frame-like stepped face 10b so as to be able to insert and take off the filter member 11 as illustrated in FIG. 4, and 10c are screw holes.

Figure 3A:
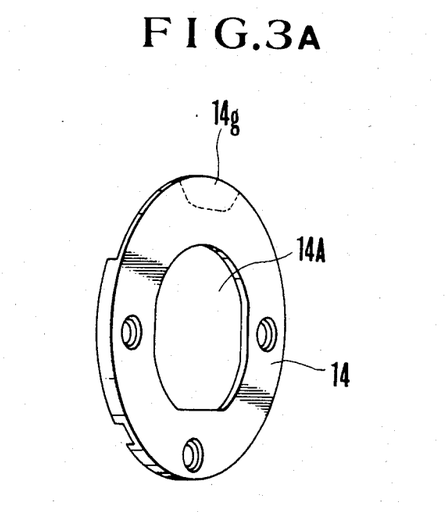
FIG. 3A is a perspective view looking from the outside of another embodiment of the holding member according to the invention.
Figure 3B:
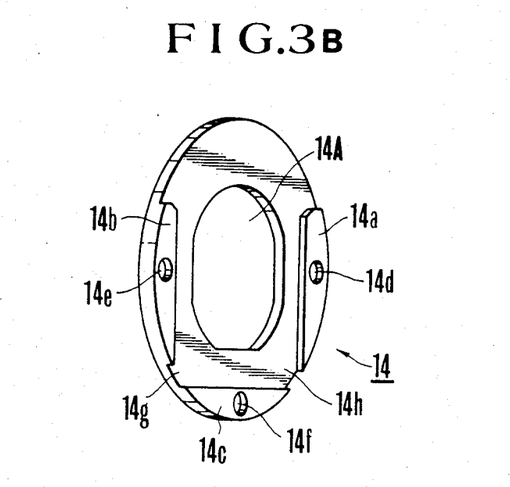
FIG. 3B is a perspective view looking from the inside of the member of FIG. 3A.
Figure 4:
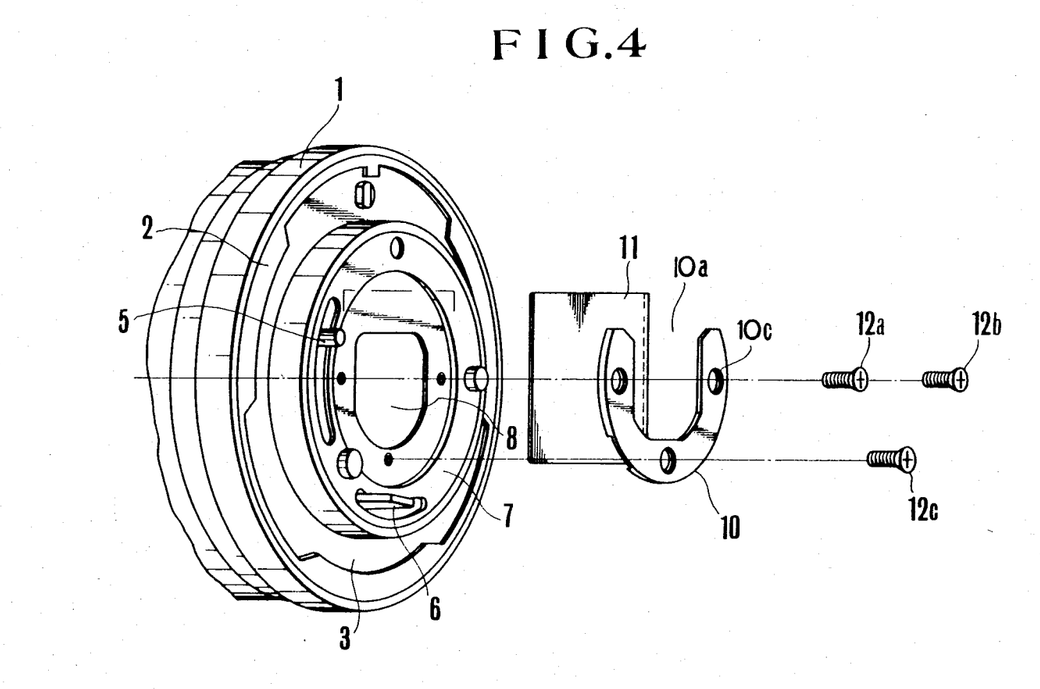
FIG. 4 is an exploded perspective view illustrating the aforesaid constituent member about to be assembled.

In the embodiment of FIGS. 3A and 3B, the filter holding member 14 is of ring-like form with the provision of an image forming light path 14A at the central portion thereof, and of stepped portions 14a, 14b and 14c on that surface thereof which confronts the cover member 8 to form a gap for insertion of the filter. Holes 14d, 14e and 14f are for screw fasteners.

In the case of the holding member of FIG. 3, to enable easy insertion and removal of the filter, a cutout portion 14g may be provided as represented by a dashed line.

Figure 5:
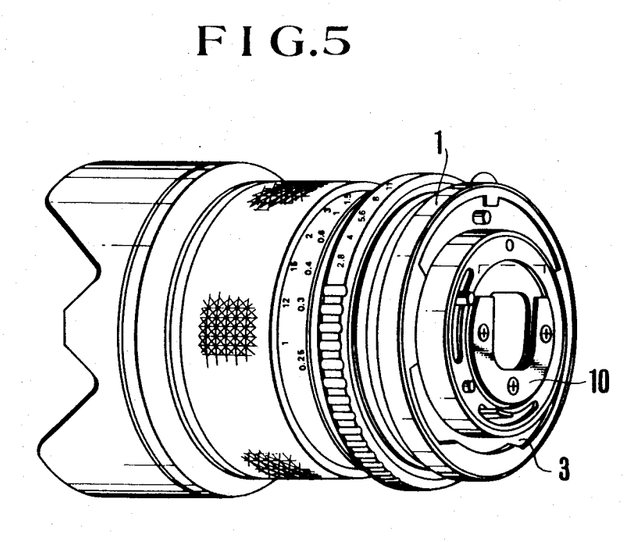
FIG. 5 illustrates the using state of the holding device.

FIG. 5 illustrates the details of the rear wall of the lens mounting which wall bears the holding member 10. After the filter member has been inserted into and seated in the stepped surface of the aforesaid holding member 10, the lens mounting is attached to the basic body such as the camera body when in use.

In the above-described embodiment of FIGS. 1 to 5, because the aforesaid holding member 10 is arranged rearwardly of the bayonet mount member 2 of the aforesaid lens mounting barrel 1, attaching and detaching of the filter member 11 thereto and therefrom is very easy work.

Also since the aforesaid adapter sleeve serves as a guide for the lens mounting to a coupling on the basic body as the lens mounting is being attached to the basic body, the operator pays full attention to the rear wall of the lens mounting. This will protect the filter or like accessory from damage by striking against something.

Figure 6:
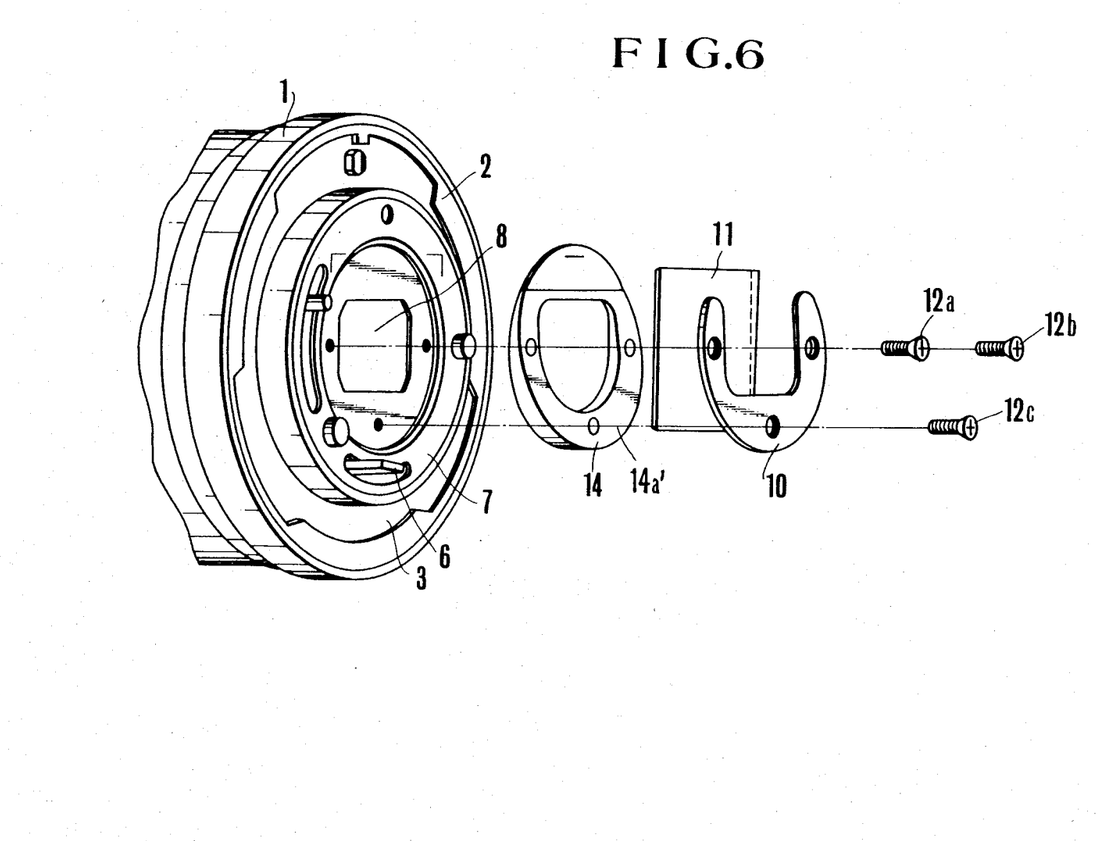
FIG. 6 is an exploded perspective view of still another embodiment of the holding device according to the present invention.

FIG. 6 illustrates an example of modification of the holding member of the invention, in which the filter member is arranged in sloping relation to the perpendicular plane of the optical axis of the objective lens with the advantage that ghost and flare spots are reduced. For this purpose, the aforesaid cover member 7 is provided with first and second holding members 10 and 14. The first holding member while being flat on that surface which confronts the cover member 7 has its opposite surface provided with a slope 14a1. The second holding member 10 is made similar in shape to that described in connection with the aforesaid embodiment. That is, provided in one surface are stepped shoulders for accommodating the filter member and an opening also to make easy attaching and detaching of the filter. As illustrated in FIG. 6, the first and second holding members 10 and 14 are fixedly secured to the aforesaid cover member 7 by screw fasteners 12a, 12b and 12c. When the filter 11 is inserted into and seated in a space defined by the stepped portions of the second holding member 10 and the rear surface of the first holding member 14, the filter 11 takes an inclined position with respect to the optical axis in conformity to the slant surface of the first holding member 14. In this embodiment, the slant surface may be provided in either of the confronting surfaces of the first and second holding members.

Figure 8:
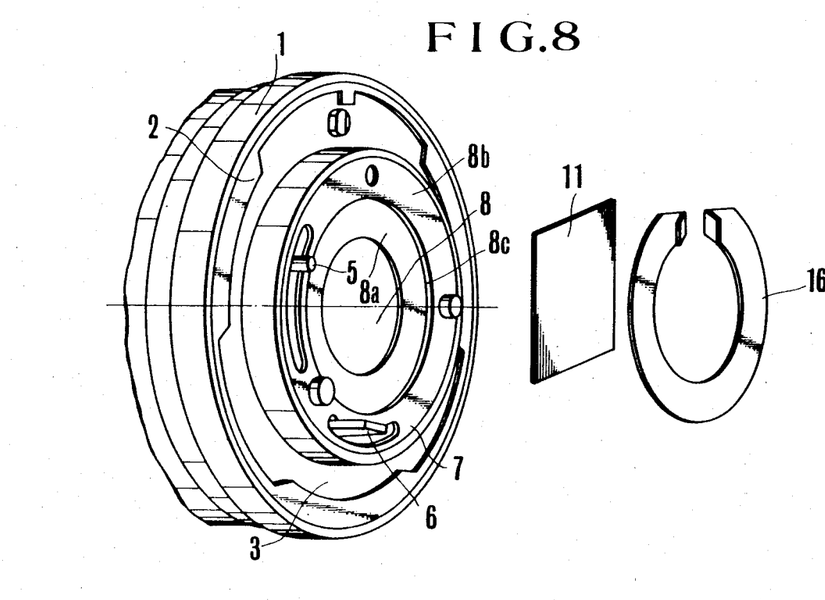
FIG. 8 is an exploded perspective view illustrating another example of application of the present invention.

FIG. 8 illustrates another example of application of the present invention in which use is made of a resilient member 16 to fix the filter 11 to the aforesaid cover member 7.

The cover member 7 has a filter receiving area 8a and a covering portion 8b. Between this receiving area 8a and the covering portion 8b is provided an axial stepped portion 8c, and the circumferential surface of this stepped portion 8c is provided with a circumferential groove in which the aforesaid resilient member 16 is to be fitted.

The filter 11 is put on the receiving area 8a, and then the resilient member 16 is fitted into the aforesaid circumferential groove, whereby the filter 11 is held stationary.

Figure 7:
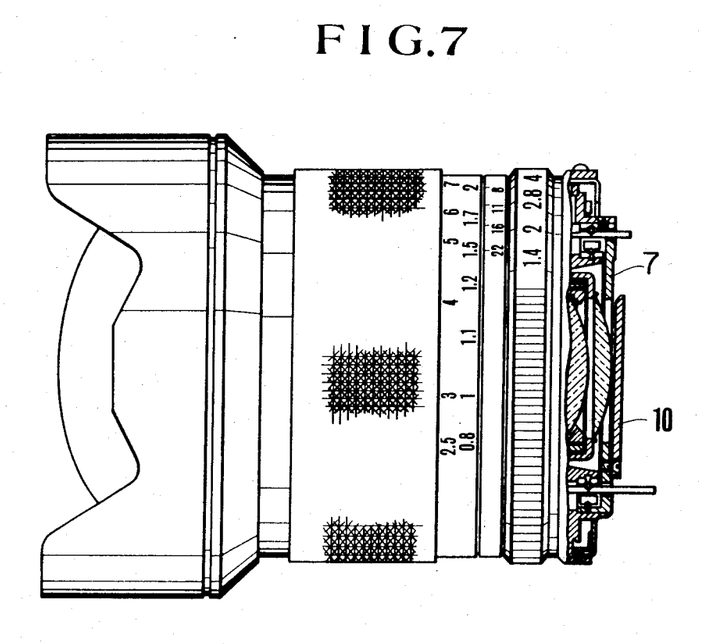
FIG. 7 is a side sectional view of an interchangeable lens mounting provided with the device of the invention.

As indicated above, the present invention provides an accessory holding device for use on the adapter portion of the attaching means (mount means) in an interchangeable lens mounting or intermediate tube, which device comprises a member 10 (or members 10, 14) arranged around the image forming light path in fixedly secured relation to the adapter portion, whereby an accessory 11 such as filter can be positioned in a plane perpendicular to the optical axis. As illustrated in FIG. 7, the holding device is provided in the rearmost position of the interchangeable lens mounting toward the basic body, so that attaching and detaching of the accessory can be performed very easily.

Another advantage of the invention arising from the arrangement of the accessory holding member 10, 14, 16 on the mating side of the interchangeable lens mounting or intermediate tube with that of the basic body is that during photography the filter or holding member does not disturb the photographer, and removal or interchanging of the filter becomes a very simple operation.

Further, the present invention provides for the aforesaid holding member 10, 14 with stepped portions 10d, 10e and 10f, 14a, 14b and 14c to form a space which is to accommodate the filter. These stepped portions are in turn provided with cutouts 10g and 10h, 14g and 14h which are advantageous to hold the filter.

That is, the gelatin filters available in the market have sizes which do not permit them to be attached to the interchangeable lens mountings and intermediate tubes. When in use, therefore, a filter of larger size must be cut to appropriate dimensions. These dimensions are so determined that at least the area of the image forming light path is covered. But, cutting of the filter accurately is time-consuming. Therefore, it is the common practice to cut the filter to a rough size, thus resulting in the production of large play in the holder. According to the present invention, however, when a cut filter of almost square shape is inserted into and seated in the space between the aforesaid stepped portion and the cover member, the lower corners of the filter enter the cutouts 10g and 10h, 14g and 14h so that the filter cannot slip off the holder. In particular, this cutout is effective when the lens moutning and intermediate tube are of the type requiring rotative movement of the lens mounting or of the tube as a whole as they are attached to the basic body.

While specific embodiments of the invention have been shown and described in detail to illustrate the application of the inventive principles, it will be understood that the invention may be embodied otherwise without departing from such principles.

What is claimed is:

1. An interchangeable lens assembly having a barrel adapted to have a filter element attached thereto comprising:
   a lens barrel member having coupling means for engaging with complementary coupling means on a camera to mount said lens assembly on said camera by rotation of said lens barrel member relative to said camera;
   a mount member rotatable relative to said lens barrel member and adapted to be held in nonrotative engagement with said camera when said coupling means are engaged with the complementary coupling means of said camera by rotating said lens barrel member to mount said lens assembly on said camera;
   a sleeve portion on said mount member extending along the optical axis of said lens assembly in a direction toward said camera when said lens assembly is mounted thereon; and a filter holding member mounted on said sleeve portion having a cutout portion forming a gap together with said sleeve portion into which a filter may be inserted for fixture on said lens assembly.

2. An assembly according to claim 1 further comprising a diaphragm device, a drive member which rotates through a rotation zone around the optical axis of said assembly to drive said diaphragm device in said interchangeable lens assembly and an opening defining an optical path formed through said sleeve portion, wherein said filter holding member is arranged between said rotation zone and said opening.

3. An assembly according to claim 2 wherein said filter holding member comprises first and second holding members.

4. An interchangeable lens assembly having a barrel adapted to have a filter element attached thereto comprising:
   a lens barrel member having coupling means for engaging with complementary coupling means on a camera to mount said lens assembly on said camera by rotation of said lens barrel member relative to said camera;
   a mount member rotatable relative to said lens barrel member and adapted to be held in nonrotative engagement with said camera when said coupling means are engaged with the complementary coupling means of said camera by rotating said lens barrel member to mount said lens assembly on said camera;
   a sleeve portion on said mount member extending along the optical axis of said lens assembly in a direction toward said camera when said lens assembly is mounted thereon; and
   filter holding means mounted on said sleeve portion forming a gap into which a filter may be inserted for fixture on said lens assembly, said filter holding means comprising a first holding member having a surface inclined relative to a plane perpendicular to the optical axis of said interchangeable lens assembly and a second holding member designed to form together with said inclined surface of said first holding member said gap wherein said filter member may be inserted.

* * * * *